A. F. VICTOR.
CONDENSING LENS FOR CINEMATOGRAPHS.
APPLICATION FILED MAR. 23, 1916.

1,212,853.

Patented Jan. 16, 1917.
3 SHEETS—SHEET 1.

Witnesses:

Inventor
Alexander Ferdinand Victor
by Frank D. Thomason
Atty.

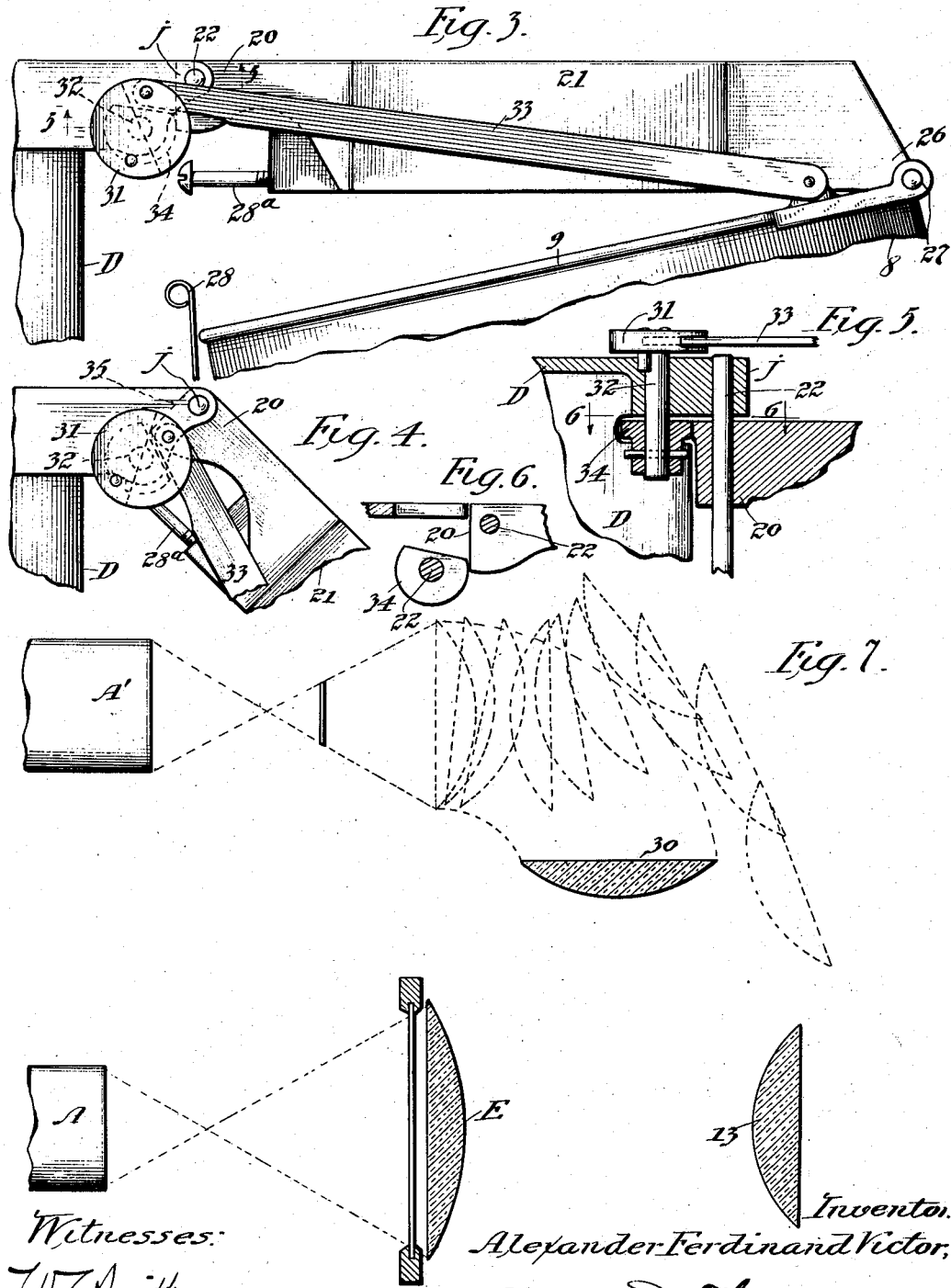

A. F. VICTOR.
CONDENSING LENS FOR CINEMATOGRAPHS.
APPLICATION FILED MAR. 23, 1916.

1,212,853.

Patented Jan. 16, 1917.
3 SHEETS—SHEET 3.

Witnesses:

Inventor:
Alexander Ferdinand Victor
by Frank D. Thomason
Atty.

UNITED STATES PATENT OFFICE.

ALEXANDER FERDINAND VICTOR, OF DAVENPORT, IOWA.

CONDENSING-LENS FOR CINEMATOGRAPHS.

1,212,853.          Specification of Letters Patent.       Patented Jan. 16, 1917.

Application filed March 23, 1916. Serial No. 86,049.

*To all whom it may concern:*

Be it known that I, ALEXANDER FERDINAND VICTOR, a subject of the King of Sweden, (having declared my intention of becoming a citizen of the United States,) residing at Davenport, in the county of Scott and State of Iowa, have invented new and useful Improvements in Condensing-Lenses for Cinematographs, of which the following is a full, clear, and exact description.

Heretofore it has been customary to use condensing lenses for combined stereopticon and cinematograph projection of sufficient diameter to fully cover what are termed "standard lantern slides", which latter are of such size that condensing lenses, not less than four inches in diameter, have been required. The use of condensing lenses of sufficient diameter to cover said standard lantern slides prohibits the use of condensing lenses of extremely short focus owing to the great curvature thereof. Lenses of shorter focus permit the placing of the illuminant closer to the rear combination of the condenser resulting in the interception of a large number of light rays permitting the use of a lower power of illuminant and yet obtaining a brilliantly projected image.

The object of my invention is to provide an arrangement—simple in action and efficient in result, to permit the use in connection with the combined lantern slide and cinematograph projector, of condensing-lenses of shorter focus than are at present employed for the purpose of gathering and concentrating the rays from the illuminant on the motion picture film to be projected. My invention therefore is to provide means for shortening the focus of the condenser when used in conjunction with the cinematograph element and lengthening said focus when used in connection with the lantern slide element as well as to spread these rays in order to cover the larger area when in use with lantern slides.

Figure 1:
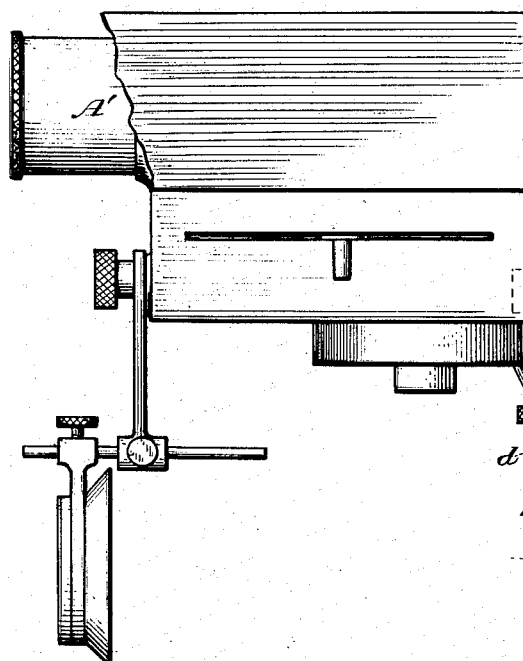
Figure 2:
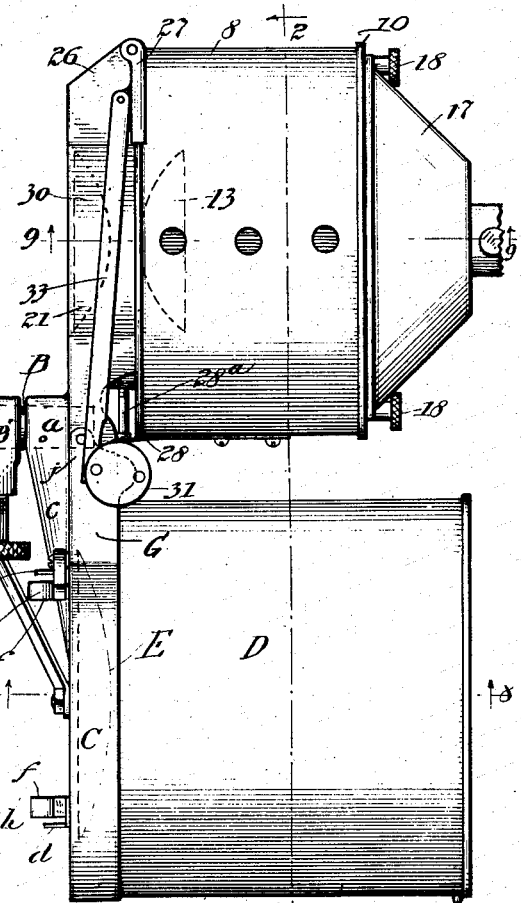
Figure 8:
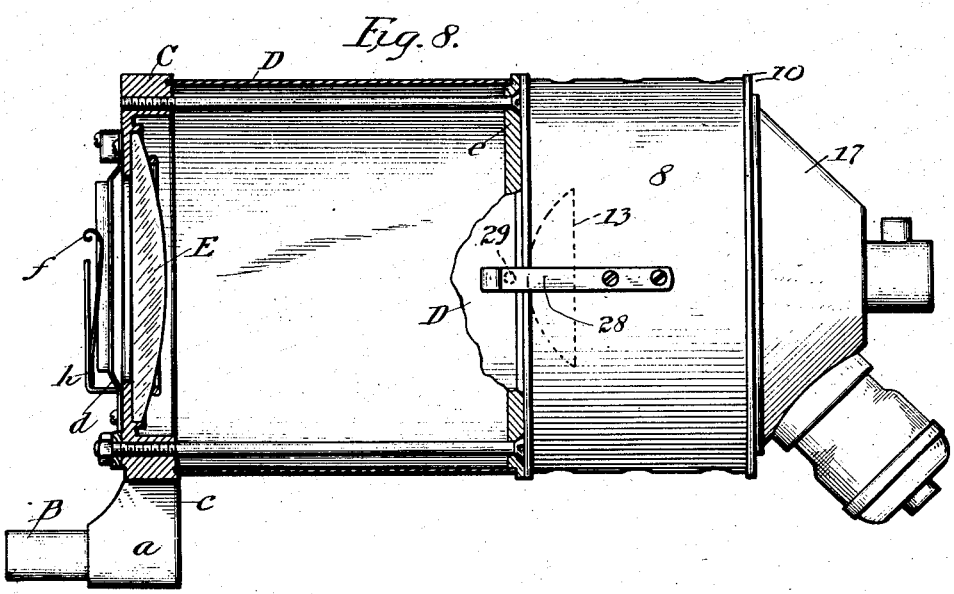
Figure 9:
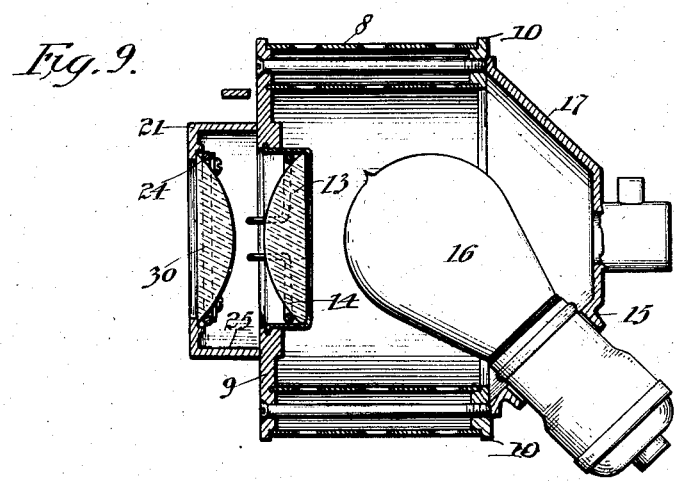

In the drawings: Figure 1 is a plan view of my improved lamp applied to a cinematograph, a fragment of which latter is broken away. Fig. 2 is a transverse vertical section thereof, taken on dotted line 2—2, Fig. 1. Fig. 3 is a plan view of a fragment of my invention drawn to an enlarged scale and illustrating the operation of the mechanism connecting the supports of the two smaller condensing lenses of the same. Fig. 4 is a similar view of a smaller fragment of the same showing said mechanism in another position. Fig. 5 is a vertical section thereof taken on dotted line 5—5, Fig. 3. Fig. 6 is a horizontal section taken on dotted line 6—6, Fig. 5. Fig. 7 is a diagrammatical view illustrating the disposition and method of using the lenses of my improved lamp. Fig. 8 is a vertical central section taken on dotted line 8—8, Fig. 1. Fig. 9 is a vertical central section taken on dotted line 9—9, Fig. 1.

My invention, as shown in the drawings, consists of a combined illuminant and an adjustable system of three condensing lenses, to-wit: two forward lenses and one rear lens, which latter can be arranged so that the rear lens can be moved back of and in axial alinement with either of the other lenses to constitute a condenser having a comparatively long focus for the lantern slide projector or a condenser having a comparatively shorter focus for the moving picture projector.

The drawings illustrate a machine for projecting either stationary or moving pictures, and A represents the lantern slide projector and A' the motion picture projector, that support the respective projecting lenses thereof.

A longitudinal bar B has one end thereof secured by means of suitable set-screws in a socket or bearing B' in the lower rear part of the frame-work of the moving picture projector, and its rear end extends to the rear a suitable distance and has the boss *a* of a bracket *c* securely but removably mounted thereon. This bracket projects downwardly and to one side from the head C of the shell of the forward stationary cylindrical section D of the lantern slide projector, and is, preferably, cast in one piece with said head. The major portion of this head is circular, and it is provided with a suitable rectangular oblong opening which is so disposed that its center is in axial alinement with said shell, and a plano-convexo condensing lens E of suitable dimensions is fited in this opening.

A lantern slide holder is secured to the front surface of the head consisting of vertical metal strips *d, d*, that are arranged next and parallel to the vertical sides of the lens opening and have their ends bent rearwardly toward and secured to said head by screws, or otherwise, so as to hold said strips alongside said lens away from the head. The vertical edges of these strips, opposite said opening, are flanged forward, and suitably shaped metal arms *h* are secured to the lower ends of the same having horizontal portions that constitute shoulders upon which the lower edge of the lantern slides rest when they are moved downward edgewise into position in front of lens E and pressed against said strips by flat spring strips *f, f*. These springs are secured to the lower ends of the upper vertical member of said arms *h* and are adapted to press against the edges of the lantern and hold the slide holder in place.

The rear end of the stationary cylindrical section D of the lantern slide projector is seated and secured in the rabbeted circumference of an annular rim *e* back of and in alinement with said stationary section is a cylindrical shell of a suitable movable lamp section 8, the body of which consists of two concentric separated cylindrical shells the diameter of the outer one of which, preferably, corresponds to that of the shell of section D. The ends of these shells are seated in circular rabbets of annular heads 9 and 10. When properly assembled these shells are secured in their proper relative positions by longitudinally elongated screws, and both of them are perforated to permit the free circulation of air through and between them.

Head 9 is provided with a central opening, and a rear condensing lens 13 of less diameter and greater convexity is seated and retained in position to close this opening by means of a suitable circular retaining frame 14 secured concentrically to the rear inner surface of head 9.

The rear side of rear head 10 has its inner margins depressed, and a truncated cone-shaped lamp support 17 whose circular edge is flanged outward, closes and laps over the marginal portion of the central opening of head 10 and is retained in this position by thumb-screws 18 tapped into said head at suitable points. The undermost portion of the conical sides of this lamp support has a suitable opening 15 therein and the socket of a tungsten, or other suitable lamp 16, is inserted therethrough and adjusted so that the lens can obtain the greatest light therefrom. If desired, however, the arc lamp set forth in Letters Patent of the United States granted to me May 27, 1913, for improvements in stereopticons, No. 1,062,622, may be substituted for the tungsten lamp. Suffice it to say that the fixed position of the illuminant is the same with reference to the rear condensing-lens, whether used in connection with the lantern frame projector of the machine or in connection with the moving picture projector, and that the same lamp is used in connection with the rear condensing-lens of the condenser for projecting lantern slide pictures as is used for the two condensing-lenses of smaller size and greater convexity of the condenser for projecting cinematograph film pictures. Instead of using an electric arc as an illuminant, a concentrated tungsten filament filled incandescent lamp, or any other suitable luminant can be used in connection with my improvements.

One side G of head C is built sidewise and the vertical edge of this built out portion is provided with knuckles *j, j*, to which the knuckles 20, 20, projecting laterally from a condensing-lens frame 21 is hinged by means of a suitable pintle 22. This hinged frame 21 is kept normally pressing against the adjacent side of housing D by means of a spring 23 which is coiled around the pintle and has the ends thereof secured by screws or otherwise to the back of the built out side *c* of head C, and the central portion thereof looped toward and attached to said hinged frame mediate its knuckle 20. This hinged lens-frame is provided with a central opening in which a lens 30, preferably, of the same diameter and convexity as lens 13 is seated and secured by a rectangular shaped spring wire clamp 24. The hinged frame 21 has its edges flanged to the rear a suitable distance, and spring clamp 24 secured to the rear surface thereof and inclosed within these flanges 25. The side of this hinged frame is built out symmetrically on the side opposite head C, and is provided with knuckles 26, 26, to which knuckles 27, 27, that project laterally from head 9, are hinged by means of suitable pins.

When the hinged frame 21 extends parallel with the side of stationary section D, the lamp section, containing condensing lens 13 and lamp, can be swung back of said section in alinement with the focal axis of the forward condensing lens E and locked to the rear end of the same by means of a spring clip 28 consisting of a longitudinally disposed flat strip of spring metal, whose rear end is secured to the side of the body of the lamp section 8, and whose forward end extends beyond head 9 and has a perforation thereon that snaps over a suitable laterally projecting pin or screw-head 29. When this clip is unlocked, said lamp section can be swung into alinement with the focal axis of lens 30 by swinging it laterally and bringing head 9 flat against the rear side of hinged frame 21, in which position it is held by clip 28 snapping over the end of a pin 28ᵃ projecting laterally from flanges 25 of the hinged frame and lens 18 brought into focal alinement with the forward lens of the condenser of the moving picture projector.

In order to prevent lens 13 from remaining in focal alinement with the lens 30 when it is separated therefrom, I employ a disk 31 which is secured to the upper end of a vertical spindle 32 which is journaled in vertical bearings back of the upper knuckles *j* of head C, and connecting said disk 31 by means of a link 33 with a pin projecting upward from the lug of the upper knuckle of the hinged frame to which the lamp section is hinged. The lower end of this spindle is provided with a disk 34, which is, preferably, less in diameter than disk 31 on its upper end, and a segment of the lower disk is cut away. The swinging-frame has a cam lug secured to and projecting to the rear from the upper knuckle 20 and when the rear section and said hinged frame are swung forward past the transverse vertical plane of head C, disk 34 will be caused to rotate so that said cam 35 will, when the lamp section and the swinging-frame are brought back into position in the same transverse plane as head C, engage the circumference of said smaller disk and prevent it from further rearward movement. To release the hinged frame from this position all that it is necessary to do is to release the clip from the pin projecting from the swinging frame and move it back toward a right angular position thereto. This causes the connecting rod to rotate said spindle and brings the segmental cut away portion of its circumference opposite cam 35 and causes the hinged frame to immediately swing back toward and parallel to and against the side of the stationary section in which position the lamp section can be swung up against and closed to the rear of the same in the manner hereinbefore set forth. By these means the moment the lenses of the condenser of the moving picture projector begin to move apart their focal alinement is destroyed and the danger of concentrating the focus of said condenser upon the film and igniting the same is avoided.

It will be apparent from the foregoing description that for stereopticon projections the rays of light from the smaller rear condensing lens will be projected forward thereby and cover the necessary area of the larger condensing lens E so that the bent rays therefrom will cover the pictures on the lantern slide and concentrate at such a point intersected by the focal axis that the diameter of the area of divergence of said rays as they enter the projecting lens of the stereopticon will produce a satisfactory reproduction or delineation of lantern slide pictures on the screen.

In view of the fact that the dimensions of a cinematograph picture are so much smaller than those of a lantern slide picture, it is permissible to intercept a greater cone of rays by use of shorter focus condensers and concentrate these rays on the film to produce a brighter image on the screen.

The novel arrangement and use of the condensing lenses embodied in my invention accomplishes the best possible results upon the screen, and while I prefer to employ the means, hereinbefore set forth, for manipulating and using said lens, I desire to be considered as contemplating the use of any other mechanical means for doing so as coming within the scope of my invention.

What I claim as new is:

1. The combination with a picture projecting machine comprising lantern-slide projecting apparatus and moving picture projecting apparatus, of condensers therefor, and means for separating the lenses of the condenser for the lantern slide projector and combining one of its lenses with a complementary condenser lens to form the moving picture condenser, and vice versa.

2. The combination with a picture projecting machine comprising lantern slide projecting apparatus and moving picture projecting apparatus, of condensers therefor, and means for separating the lenses of the condenser for the lantern slide projector and combining the rear condensing lens thereof with the forward complementary condensing lens of the moving picture condenser, and vice versa.

3. The combination with a picture projecting machine comprising lantern slide projecting apparatus and moving picture projecting apparatus, of a condenser for the former employing two lenses of different sizes and convexity, and a condenser for the latter employing two lenses corresponding in size and convexity to the smaller lens of the condenser of said lantern slide projector, and means for separating the lens of the lantern slide condenser and combining the rear smaller lens thereof with the complementary lens of the moving picture projector, and vice-versa.

4. The combination with a picture projecting machine comprising lantern slide projecting apparatus and moving picture projecting apparatus, of a condenser for the former employing a forward stationary lens and a rear smaller lens of greater convexity, and a condenser for the latter employing two lenses corresponding in diameter and convexity to the smaller lens of the first mentioned condenser, and means for separating the rear lens of the condenser of the lantern slide projector and combining it with the forward lens of the moving picture projector, and vice versa.

5. The combination with a picture projecting machine comprising lantern slide projecting apparatus and moving picture projecting apparatus, of a condenser for the former employing a forward stationary lens and a rear movable smaller lens of greater convexity, and a condenser for the latter employing two movable lenses corresponding in diameter and convexity to the smaller lens of the first mentioned condenser of the lantern slide projector, and means for separating the rear lens of the condenser of the lantern slide projector and combining it with the forward lens of the moving picture projector, and vice versa.

6. The combination with a picture projecting machine comprising lantern slide projecting apparatus, and moving picture apparatus, of a condenser for the former employing a forward stationary lens and a movable rear lens of greater convexity, a condenser for the moving picture projector employing two movable and separated lenses corresponding in diameter and convexity to the rear lens of said lantern slide projector and nearer together than the same, and means for separating the rear lens of said lantern slide projector and combining it with the front lens of the condenser of the moving picture projector, and vice versa.

7. The combination with a picture projecting machine comprising lantern slide projecting apparatus and moving picture projecting apparatus, of a condenser for the former employing a forward stationary lens and a rear movable lens of shorter focus, and a condenser of less foci for the latter employing two movable lenses of a shorter focus, and means for separating the rear lens of the condenser of the lantern slide projector and combining it with the forward lens of the moving picture projector, and vice versa.

8. The combination with a picture projecting machine comprising lantern slide projecting apparatus and moving picture projecting apparatus, of condensers therefor, means for separating the lenses of the condenser for the lantern slide projector and combining the rear condensing lens thereof with the forward complementary condensing lens of the moving picture condenser, and vice versa, and devices which when the lenses of the moving picture condenser separate move said lenses out of axial alinement.

9. The combination with a picture projecting machine comprising lantern slide projecting apparatus and moving picture projecting apparatus, of a condenser for the former employing two condensing lenses of different foci, the rear one of which is movable, a suitable illuminant, a condenser of shorter focus than the lantern slide condenser for the moving picture projector which employs two condensing lenses, and means that support the rear lens of said lantern slide condenser and said illuminant and are adapted to move said rear lens and illuminant from operative position back of the forward lens of the lantern slide condenser into operative position back of the forward lens of the moving picture condenser, and vice versa.

10. The combination with a picture projecting machine comprising lantern slide projecting apparatus and moving picture projecting apparatus, of a condenser for the former employing two condensing lenses of different foci the rear one of which is movable, a suitable illuminant, a condenser of shorter focus than the lantern slide condenser for the moving picture projector which employs two condensing lenses, means that support the rear lens of said lantern slide condenser and said illuminant and are adapted to move said rear lens and illuminant from operative position back of the forward lens of the lantern slide condenser into operative position back of the forward lens of the moving picture condenser, and vice versa, and devices which when the lenses of the moving picture condenser separate move said lenses out of focal alinement with each other.

11. The combination with a picture projecting machine comprising lantern-slide projecting apparatus and moving picture projecting apparatus, of condensers therefor, means for separating the lenses of the condenser for the lantern slide projector and combining one of its lenses with a complementary condensing lens to form the moving picture condenser, and vice versa, and a suitable illuminant carried by and movable with said means in focal alinement with said separated lens.

12. The combination with a picture projecting machine comprising lantern slide projecting apparatus and moving picture projecting apparatus, of condensers therefor, means for separating the lenses of the condenser for the lantern slide projector and combining the rear condensing lens thereof with the forward complementary condensing lens of the moving picture condenser, and vice versa, and a suitable illuminant carried by and movable with said means in focal alinement with said separated lens.

13. The combination in a picture projecting machine of the kind described, with a condenser for the lantern slide projector consisting of a forward condensing lens, a housing therefor, a rear condensing lens and a removable support for the same, of the forward lens of the condenser of the motion picture projector of the machine, a frame therefor to which said rear lens support is connected and which is pivotally connected to said housing and adapted to move said rear condensing lens into axial alinement with either the forward lens of the condenser of the lantern slide projector or the forward lens of the moving picture projector.

14. The combination in a picture projecting machine of the kind described with the condenser of the lantern slide projector thereof consisting of a forward condensing lens, a housing therefor, a rear condensing lens and support therefor, of the forward lens of the condenser of the motion picture projector, a frame in which the same is carried which is hinged to the side of the housing adjacent its forward end and which opposite said hinge has said rear condensing lens support attached thereto and adapted to move said rear condensing lens support into axial alinement with the front lens of either of said condensers.

15. The combination in a picture projecting machine of the kind described with the condenser of the lantern slide projector thereof consisting of a forward condensing lens, a housing therefor, a rear condensing lens and support therefor, of the forward lens of the condenser of the motion picture projector, a frame in which the same is carried which is hinged to the side of the housing adjacent its forward end and which opposite said hinge has said rear condensing lens support hinged thereto and is adapted to move said rear condensing lens support into axial alinement with the front lens of either of said condensers.

16. The combination in a picture projecting machine of the kind described with the condenser of the lantern slide projector thereof consisting of a forward condensing lens, a housing therefor, a rear condensing lens and support therefor, of the forward lens of the condenser of the motion picture projector, a frame in which the same is carried which is hinged to the side of the housing adjacent its forward end and which opposite said hinge has said rear condensing lens support attached thereto and is adapted to move said rear condensing lens support into axial alinement with the front lens of either of said condensers, and devices for causing the focus of said rear lens to move out of alinement with the front lens of the condenser of the moving picture projector when the same are separated.

17. The combination in a picture projecting machine of the kind described with the condenser of the lantern slide projector thereof consisting of a forward condensing lens, a housing therefor, a rear condensing lens and support therefor, of the forward lens of the condenser of the motion picture projector, a frame in which the same is carried that is hinged to the side of the housing adjacent its forward end and which opposite said hinge has said rear condensing lens support hinged thereto and is adapted to move said rear condensing lens support into axial alinement with the front lens of either of said condensers, and devices for causing the focus of said rear lens to move out of alinement with the front lens of the condenser of the moving picture projector when the same are separated.

18. The combination in a picture projecting machine of the kind described with the condenser of the lantern slide projector thereof consisting of a forward condensing lens, a housing therefor, a rear condensing lens and support therefor, of the forward lens of the condenser of the motion picture projector, a frame in which the same is carried that is hinged to the side of the housing adjacent its forward end and which opposite said hinge has said rear condensing lens support attached thereto and is adapted to move said rear condensing lens support into axial alinement with the front lens of either of said condensers, and devices including a link one end of which is pivoted to the frame in which the front lens of the condenser of the moving picture projector is carried, and the other end to the said housing eccentric to the pivotal axis of the hinge of said frame.

In witness whereof I have hereunto set my hand this 13th day of March, 1916.

ALEXANDER FERDINAND VICTOR.

Witnesses:
FRANK D. THOMASON,
UDO CLAUSSEN.